(12) United States Patent
Kawata (10) Patent No.: US 9,255,554 B2
(45) Date of Patent: Feb. 9, 2016

(54) AIR CLEANER STRUCTURE OF MOTORCYCLE

(71) Applicant: SUZUKI MOTOR CORPORATION, Hamamatsu-shi, Shizuoka (JP)

(72) Inventor: Koichiro Kawata, Hamamatsu (JP)

(73) Assignee: SUZUKI MOTOR CORPORATION, Hamamatsu-Shi, Shizuoka (JP)

(*) Notice: Subject to any disclaimer, the term of this patent is extended or adjusted under 35 U.S.C. 154(b) by 0 days.

(21) Appl. No.: 14/297,188

(22) Filed: Jun. 5, 2014

(65) Prior Publication Data

US 2014/0360797 A1 Dec. 11, 2014

(30) Foreign Application Priority Data

Jun. 6, 2013 (JP) .................................. 2013-119983

(51) Int. Cl.
*B60K 13/02* (2006.01)
*F02M 35/02* (2006.01)
*F02M 35/16* (2006.01)
*F02M 35/10* (2006.01)

(52) U.S. Cl.
CPC ............ *F02M 35/0201* (2013.01); *B60K 13/02* (2013.01); *F02M 35/02* (2013.01); *F02M 35/162* (2013.01); *F02M 35/10013* (2013.01)

(58) Field of Classification Search
CPC ..... B60K 13/02; F02M 35/162; F02M 35/02; F02M 35/10013
USPC .................................................. 180/68.3, 219
See application file for complete search history.

(56) References Cited

U.S. PATENT DOCUMENTS

| | | | |
|---|---|---|---|
| 2005/0051375 A1* | 3/2005 | Momosaki .................... | 180/219 |
| 2007/0144802 A1* | 6/2007 | Tsuya ........................... | 180/68.2 |
| 2008/0121449 A1* | 5/2008 | Fujimura ...................... | 180/68.3 |
| 2008/0121450 A1* | 5/2008 | Fujimura ...................... | 180/68.3 |
| 2011/0155492 A1* | 6/2011 | Matsuda et al. .............. | 180/68.3 |
| 2015/0007786 A1* | 1/2015 | Kawata ......................... | 123/52.1 |
| 2015/0083513 A1* | 3/2015 | Ito et al. ....................... | 180/229 |

FOREIGN PATENT DOCUMENTS

JP 2000-016369 1/2000

* cited by examiner

*Primary Examiner* — Joseph Rocca
*Assistant Examiner* — Marlon Arce
(74) *Attorney, Agent, or Firm* — Troutman Sanders LLP (57) ABSTRACT

An opening of an upper surface of an air cleaner main body has an air cleaner upper cover mounted thereon, and is closed by the air cleaner upper cover fastened by bolts via a seal member, and air cleaner bottom plates are fastened to the air cleaner main body via seal members in openings of a bottom surface of the air cleaner main body. Passage holes connecting an engine combustion chamber and the air cleaner main body are provided on the air cleaner bottom plates; and an opening of a front surface of the air cleaner main body is inserted into intake ducts of vehicle body frames via seal members, and configured as an air introduction port.

8 Claims, 11 Drawing Sheets

AIR CLEANER STRUCTURE OF MOTORCYCLE

CROSS-REFERENCE TO RELATED APPLICATION

This application is based upon and claims the benefit of priority of the prior Japanese Patent Application No. 2013-119983, filed on Jun. 6, 2013, the entire contents of which are incorporated herein by reference.

BACKGROUND OF THE INVENTION

1. Field of the Invention

The present invention typically relates to, in a motorcycle in which an engine is mounted on vehicle body frames extended diagonally rear downward from a steering head pipe, a structure of an air cleaner disposed above the engine.

2. Description of the Related Art

In a vehicle such as a motorcycle, if an openable/closable opening is provided on an upper portion of an air cleaner mounted above an engine, it is possible to perform a maintenance in the air cleaner. Further, in a case where vehicle body frames from which an air cleaner cannot be detached are employed, a maintenance and the like cannot be conducted unless an engine is one dismounted from the vehicle body frames.

For example, in a motorcycle having a monocoque frame disclosed in Patent Document 1, inspection windows (41) for performing inspection and cleaning in the inside of air cleaner are formed, and covers (42) are attached to the inspection windows in an openable/closable manner.

[Patent Document 1] Japanese Laid-open Patent Publication No. 2000-16369

Meanwhile, for conducting a maintenance and the like of throttle bodies positioned at a lower side of an air cleaner, there is a need to remove the air cleaner from a vehicle. In Patent Document 1, although the maintenance in the air cleaner can be conducted from the openings of an upper portion of the air cleaner, an engine has to be dismounted for conducting a maintenance of throttle bodies disposed at a lower side of the air cleaner.

SUMMARY OF THE INVENTION

The present invention is made in view of each circumstances, and an object thereof is to provide an air cleaner structure of a motorcycle excellent in maintenability and the like including a maintenability of peripheral members and the like.

An air cleaner structure of a motorcycle of the present invention is characterized in that it has, in the motorcycle in which an engine is mounted on vehicle body frames extended diagonally rear downward from a steering head pipe, throttle bodies are disposed in a vertical posture in a passage connecting an air cleaner disposed above the engine and an engine combustion chamber, and a part of the air cleaner is disposed by being overlapped with the vehicle body frames in a shape in which upper surfaces thereof are narrowed inwardly, in a side view, an air cleaner main body having openings formed on a front surface, an upper surface and a bottom surface thereof, respectively, in which the opening of the upper surface has an air cleaner upper cover mounted thereon, and is closed by the air cleaner upper cover fastened by bolts via a seal member, air cleaner bottom plates are fastened to the air cleaner main body via seal members in the openings of the bottom surface, passage holes connecting the engine combustion chamber and the air cleaner main body are provided on the air cleaner bottom plates, and the opening of the front surface is inserted into intake ducts of the vehicle body frames via seal members, and configured as an air introduction port.

Further, it is characterized in that in the air cleaner structure of the motorcycle of the present invention, the motorcycle has a parallel multicylinder engine, the throttle bodies are divided in right and left directions as a plurality of units by corresponding to a predetermined combination of cylinders, at least two of the openings of the bottom surface are provided in right and left directions by corresponding to the plurality of units of the throttle bodies, and each of the openings is set to have a size capable of making the unit of the throttle bodies pass through the opening.

Further, it is characterized in that in the air cleaner structure of the motorcycle of the present invention, at least two of the air cleaner bottom plates are provided in right and left directions by corresponding to the openings of the bottom surface, and the respective air cleaner bottom plates are fastened to the corresponding throttle bodies.

Further, it is characterized in that in the air cleaner structure of the motorcycle of the present invention, the air cleaner main body is inserted from a position below the vehicle body frames before mounting the engine, a front part of the air cleaner main body is inserted into the intake ducts of the vehicle body frames via the opening of the front surface on the seal members, and a rear part of the air cleaner main body is supported in a floating manner by the vehicle body frames via cushion members.

Further, it is characterized in that in the air cleaner structure of the motorcycle of the present invention, an air filter diagonally disposed toward a direction of the opening of the upper surface is attached between the opening of the front surface and the openings of the bottom surface in the air cleaner main body.

DETAILED DESCRIPTION OF THE PREFERRED EMBODIMENTS

Hereinafter, a preferred embodiment of an air cleaner structure of a motorcycle in the present invention will be described based on the drawings.

Figure 1:
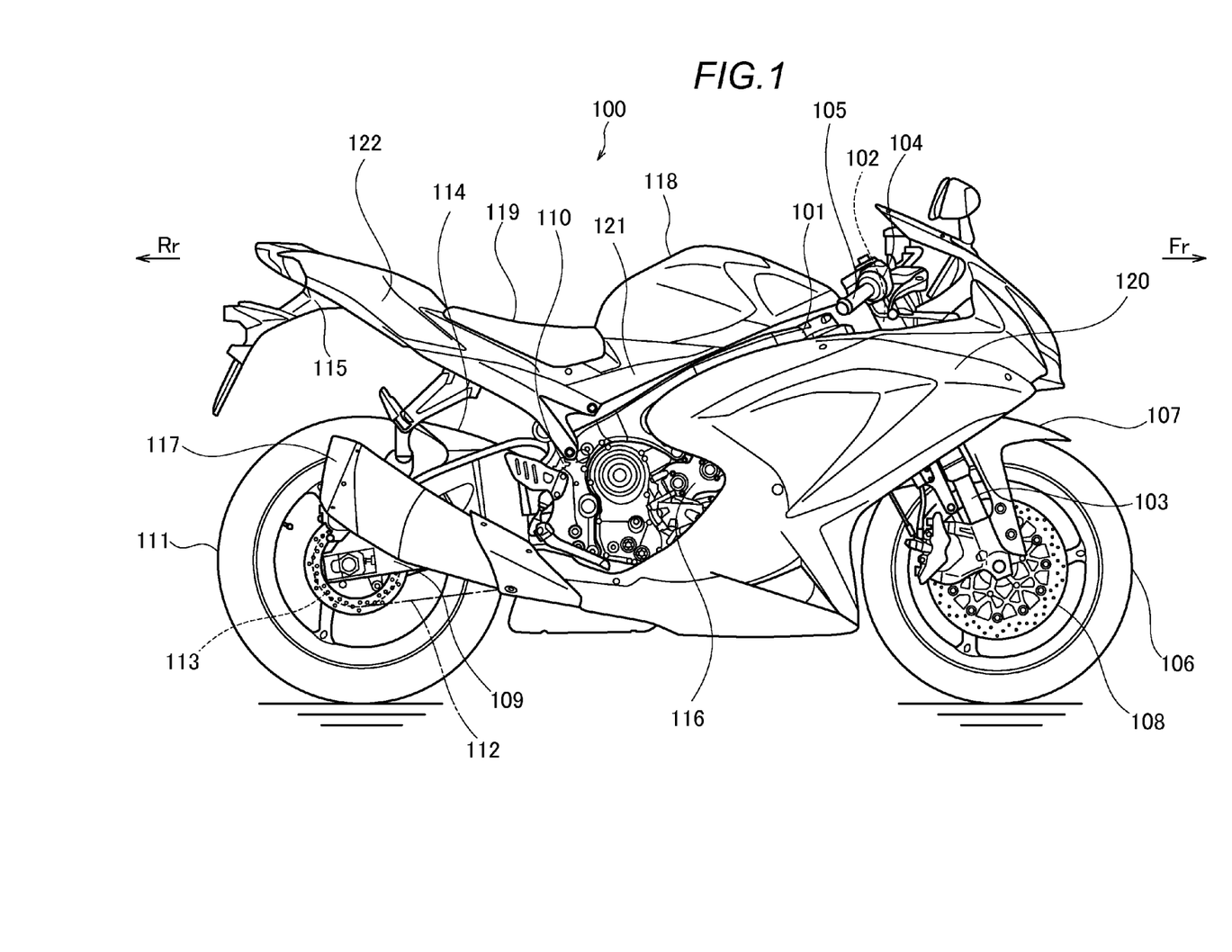
FIG. 1 is a side view of a motorcycle according to an embodiment of the present invention.

FIG. 1 is a side view of a motorcycle 100 as an application example of the present invention. At first, an entire configuration of the motorcycle 100 will be described by using FIG. 1. Note that in the drawings used in the following description including FIG. 1, a front side of a vehicle is represented by an arrow mark Fr, a rear side of the vehicle is represented by an arrow mark Rr, a lateral right side of the vehicle is represented by an arrow mark R, and a lateral left side of the vehicle is represented by an arrow mark L, respectively, according to need.

In FIG. 1, in a front part of vehicle body frames 101 (main frames) made of steel or aluminum alloy material, there are provided two right and left front forks 103 supported to be able to pivot in right and left directions by a steering head pipe 102. A handle bar 104 is fixed to upper ends of the front forks 103, and the handle bar 104 has grips 105 on both ends thereof. A front wheel 106 is rotatably supported by lower portions of the front forks 103, and a front fender 107 is fixed so as to cover a part above the front wheel 106. The front wheel 106 has a brake disk 108 which rotates integrally with the front wheel 106.

The vehicle body frames 101 are integrally coupled to a rear portion of the steering head pipe 102, the pair of right and left frames are branched into a two-pronged shape toward the rear direction, and extend rearward and downward from the steering head pipe 102 while enlarging a width thereof. In the present example, a so-called twin spar frame adopted as a suitable frame for a vehicle required to have a high-speed performance, is set to be employed. Incidentally, from a vicinity of rear portions of the vehicle body frames 101, a seat rail 101A extends rearward by being moderately inclined rearward and upward, to support a later-described seat. Further, swing arms 109 are coupled to the rear portions of the vehicle body frames 101 in a swingable manner, and a rear shock absorber 110 is laid between the swing arms 109. A rear wheel 111 is rotatably supported on rear ends of the swing arms 109. The rear wheel 111 is rotationally driven via a driven sprocket 113 around which a chain 112 that transmits motive power of a later-described engine is wound. It is possible that, in a periphery of a part which is very close to the rear wheel 111, there is provided an inner fender 114 covering a vicinity of a front part of and above the rear wheel 111, and a rear fender 115 is disposed at a position above the inner fender 114.

To an engine unit 116 mounted on the vehicle body frames 101, an air-fuel mixture formed of air and fuel supplied from not-illustrated air cleaner and fuel supply system, respectively, is supplied, and an exhaust gas after combustion in the engine passes through an exhaust pipe to be exhausted from a muffler 117. A fuel tank is mounted at a position above the engine unit 116, and the fuel tank is covered by a tank cover 118. A seat 119 is continuously provided behind the fuel tank.

In an exterior of the vehicle, mainly a front part and side parts of the vehicle are covered by a fairing 120 and side cowls 121, a rear part of the vehicle is covered by side covers or a seat cowl 122, and by these exterior members, an appearance form of the vehicle, which has so-called streamlined shape, is formed.

Figure 2:
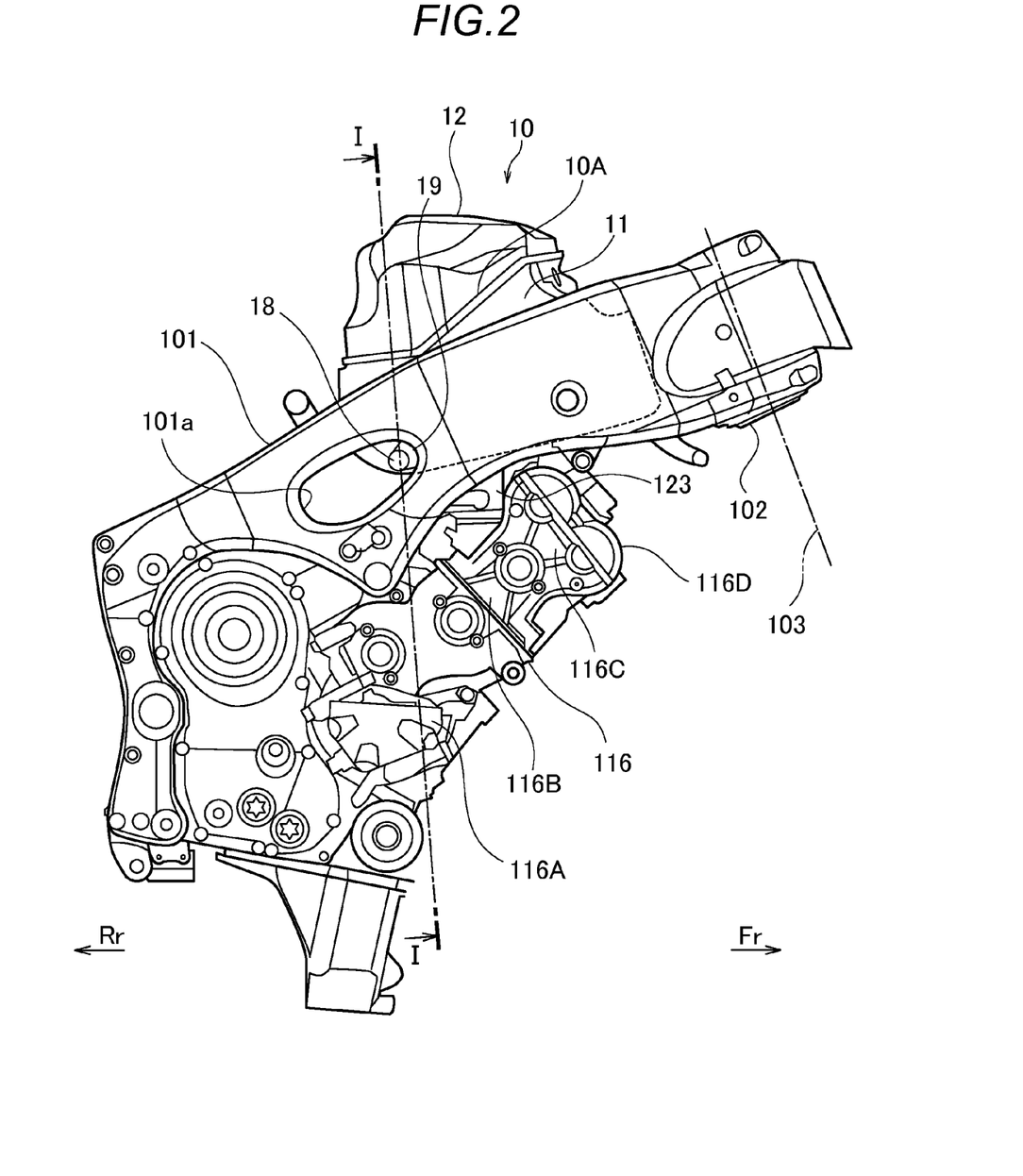
FIG. 2 is a side view illustrating a state in which an engine unit and an air cleaner are mounted on vehicle body frames in the embodiment of the present invention.

In the present embodiment, the engine of the engine unit 116 may be a four-cycle multicylinder engine, typically, a parallel four-cylinder engine, for example. Here, the engine unit 116 in this embodiment is formed in a manner that a cylinder block 116B, a cylinder head 116C and a cylinder head cover 116D are sequentially and integrally coupled on an upper part of a crankcase 116A, as illustrated in FIG. 2. Further, the engine unit 116 is suspended to the vehicle body frames 101 via a plurality of engine mounts to be integrally coupled to and supported by the vehicle body frames 101, and the engine unit 116 itself functions as a rigid member of the vehicle body frames 101.

Figure 3:
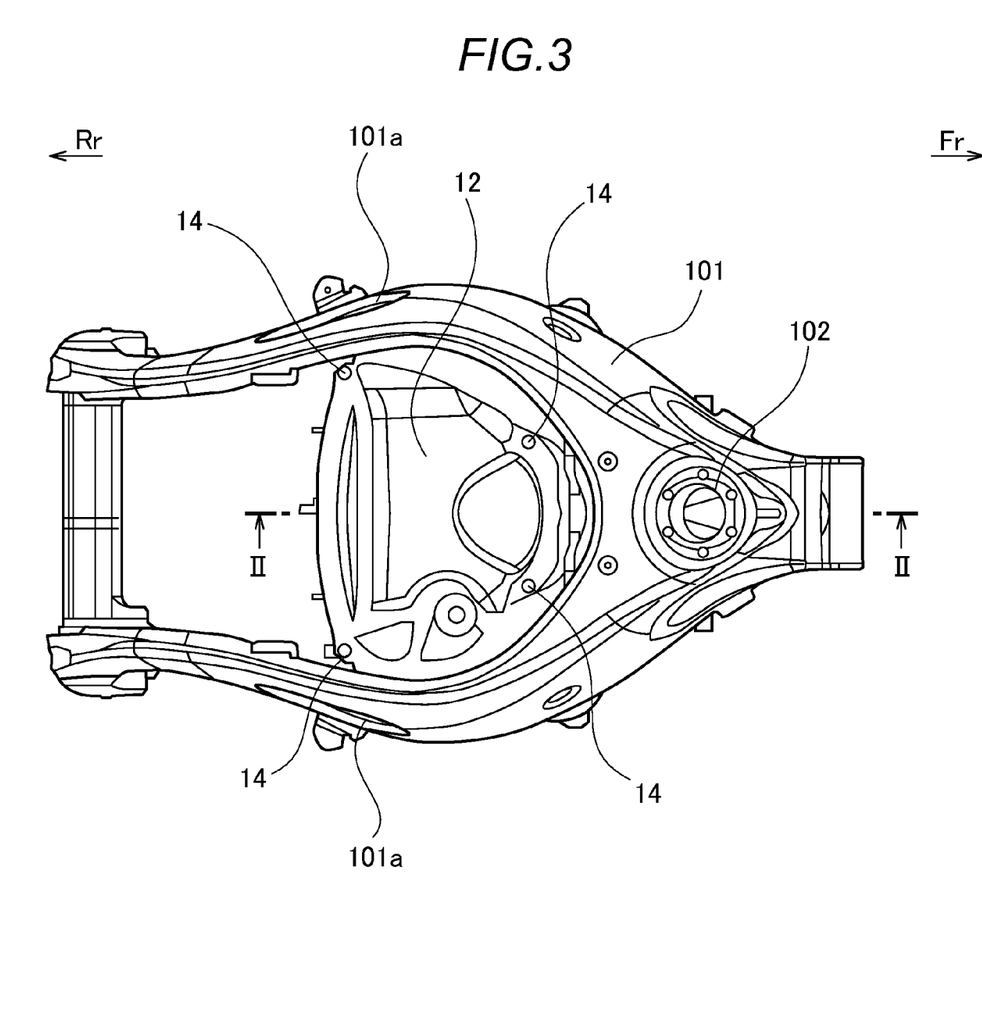
FIG. 3 is a top view illustrating a state in which the engine unit and the air cleaner are mounted on the vehicle body frames in the embodiment of the present invention.
Figure 4A:
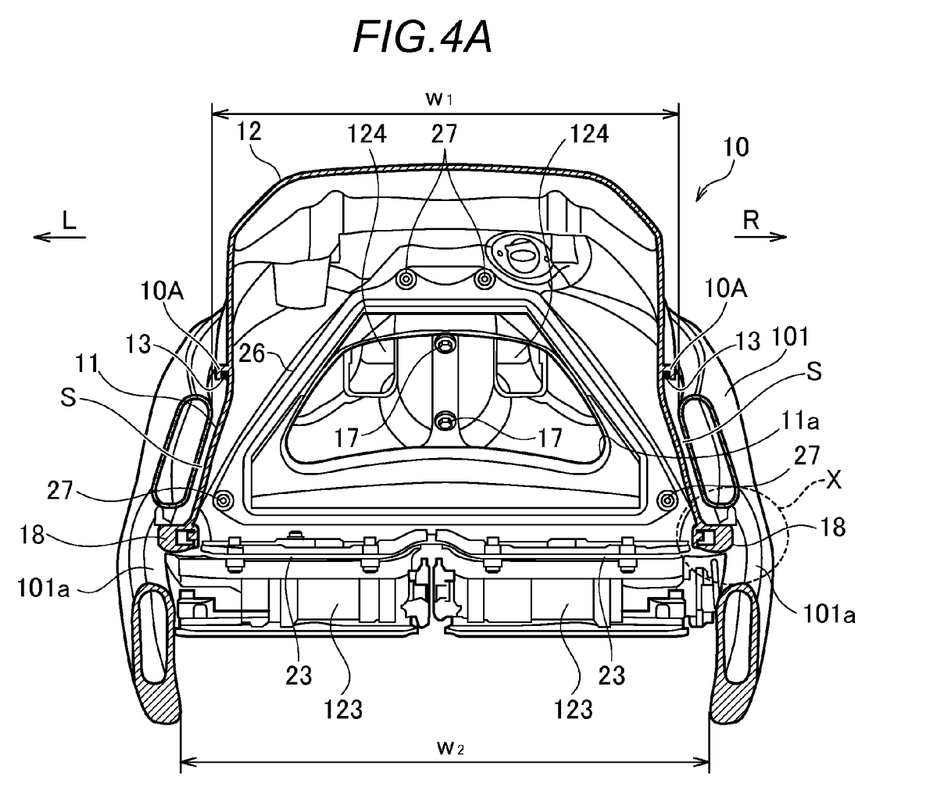
FIG. 4A is a sectional view taken along line I-I in FIG. 2.

In FIG. 2 and FIG. 3, the pair of right and left vehicle body frames 101 extend rearward and slightly downward from the steering head pipe 102. As illustrated in FIG. 3, a width between mutual right and left inner surfaces of the vehicle body frames 101 smoothly and gradually increases from the steering head pipe 102 to the rear direction, and there is provided an inner space or a space typically exhibiting an oval shape or a drop shape, if only partially. As illustrated in FIG. 2, the vehicle body frame 101 has a width in up and down directions which is approximately the same as a length in an axial direction of the steering head pipe 102. In this case, as illustrated in FIG. 4A, an upper surface side of the vehicle body frames 101 is formed to have a width narrower than a width of a lower surface side of the vehicle body frames 101, namely, the vehicle body frames 101 have an inverted V-shape in which the upper surfaces thereof are shaped to b e narrowed inwardly. Specifically, an inner width $w_1$ on the upper surface side is set to be smaller than an inner width $w_2$ on the lower surface side.

Figure 5:
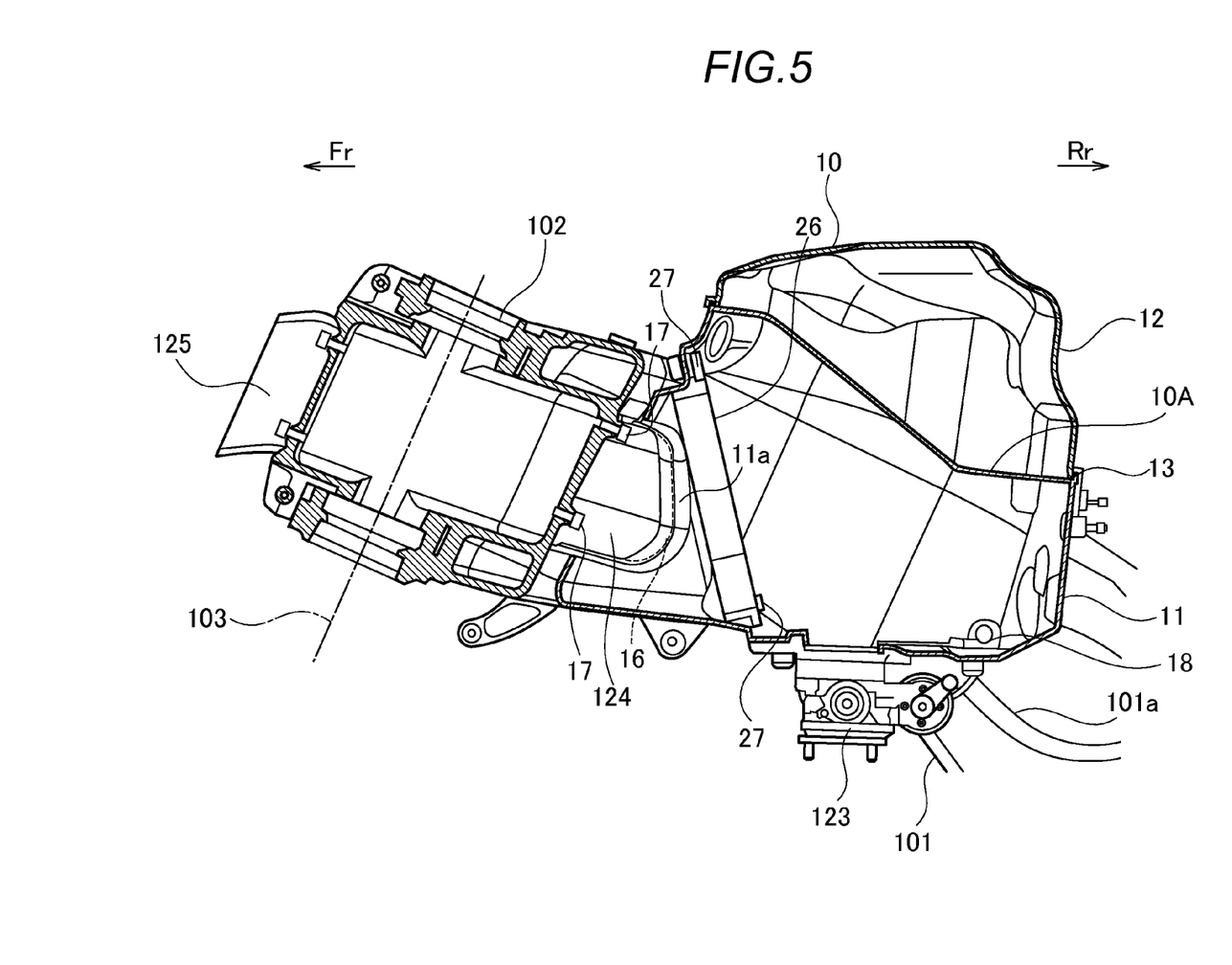
FIG. 5 is a sectional view taken along line II-II in FIG. 3.

In the inner space or the space formed between the right and left vehicle body frames 101 having a form as described above, an air cleaner 10 is housed and disposed, as illustrated in FIG. 4A, FIG. 5 and the like, The air cleaner 10 and the engine unit 116, particularly the cylinder head 116C, are connected by throttle bodies forming an intake device. Air cleaned by the air cleaner 10 is taken in by the intake device, and fuel is supplied from the fuel supply system, and accordingly, an air-fuel mixture with a predetermined mixture ratio is supplied to an intake port of the cylinder head 116C. As can be understood from FIG. 2 as well, the air cleaner 10 is positioned above the cylinder head 116C. In an intake passage connecting an engine combustion chamber which is communicated with the intake port and the air cleaner 10, throttle bodies 123 are disposed in a vertical posture in an approximately vertical direction as illustrated in FIG. 2 or FIG. 5, namely, in the present example, a downdraft type intake structure is employed.

Figure 6:
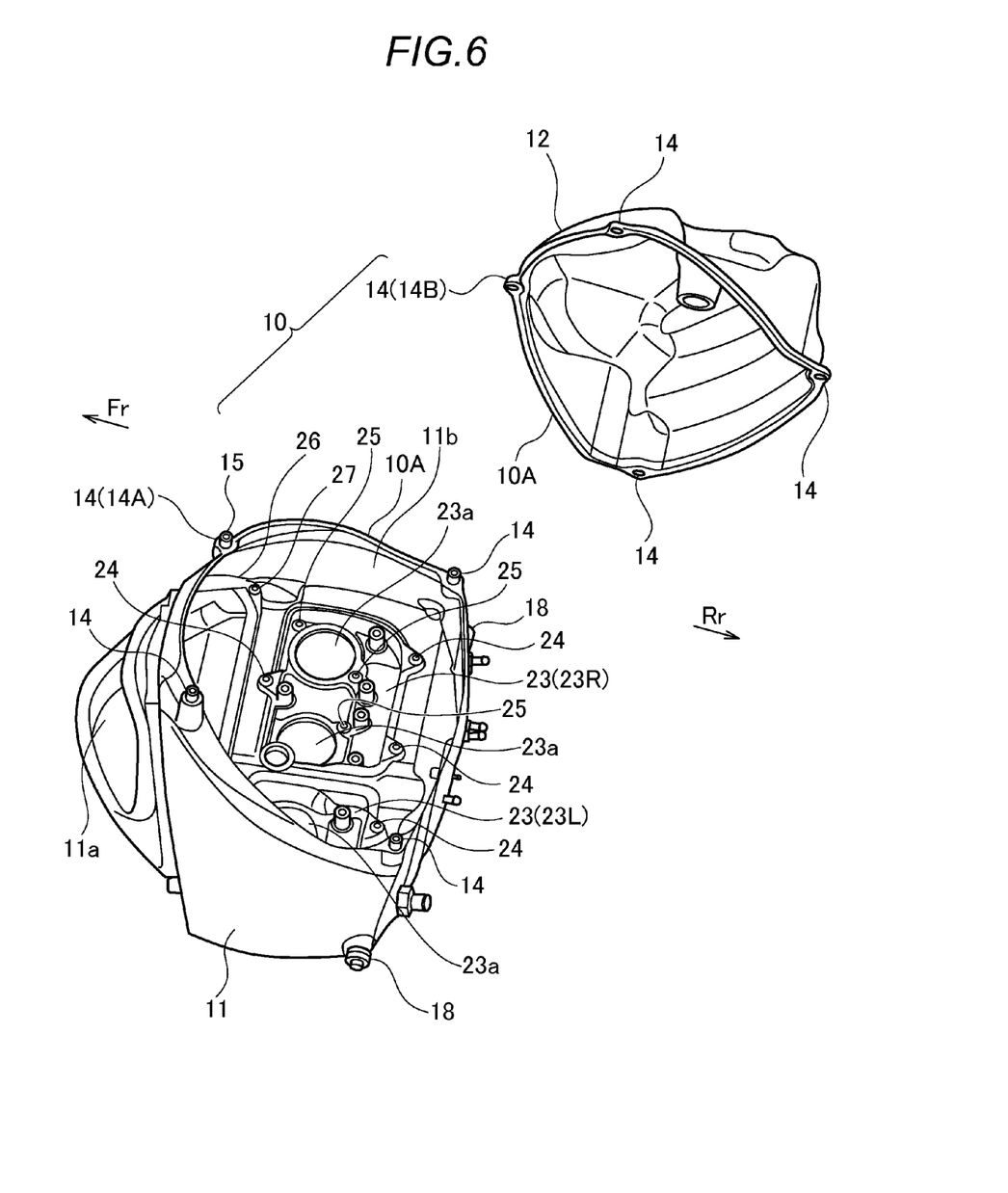
FIG. 6 is an exploded perspective view of the air cleaner when bottom plates and the like are attached, in the embodiment of the present invention.
Figure 7:
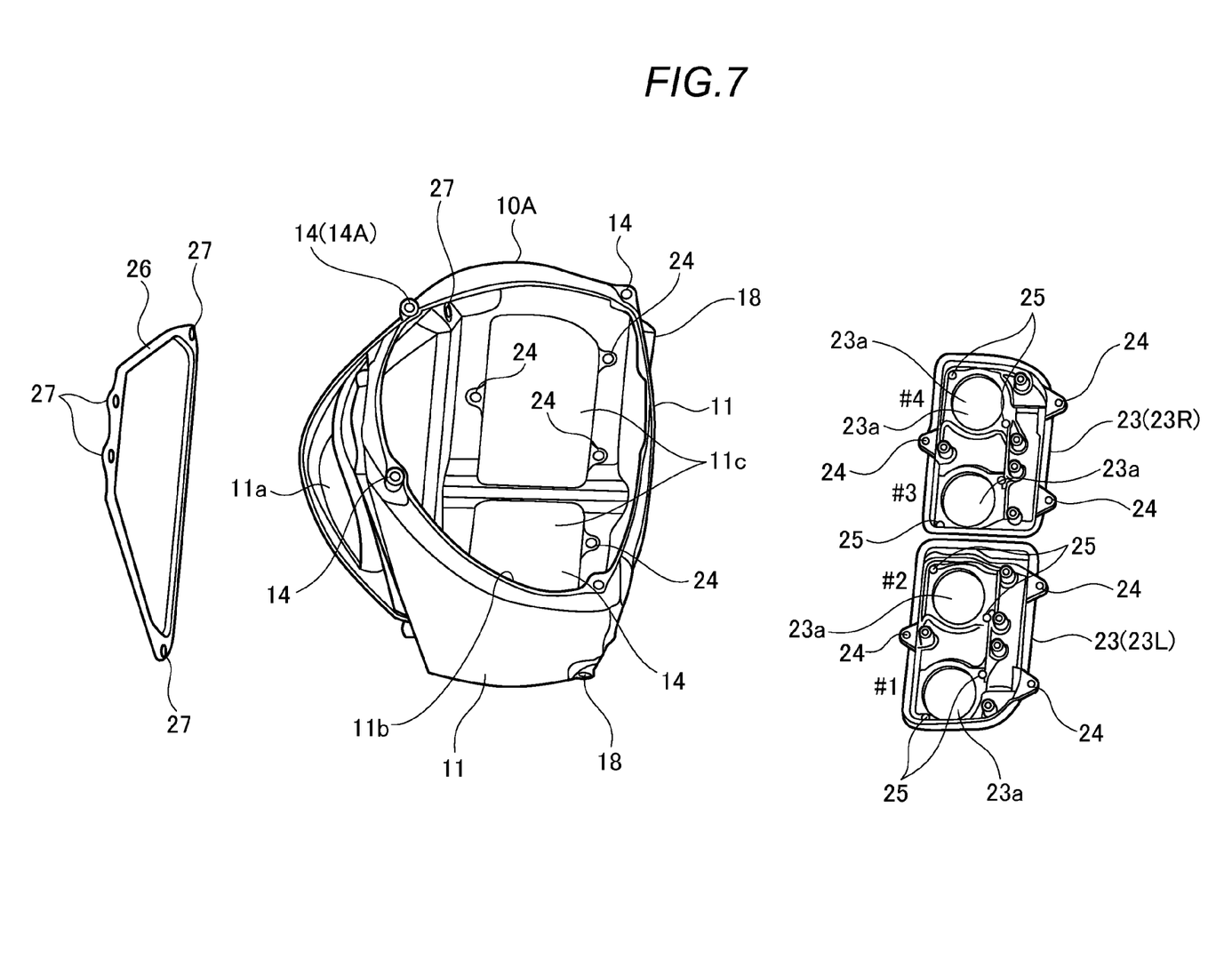
FIG. 7 is an exploded perspective view of the air cleaner when the bottom plates and the like are detached, in the embodiment of the present invention.

Here, FIG. 6 and FIG. 7 illustrate a concrete configuration example of the air cleaner 10 in the present embodiment. The air cleaner 10 is formed of an air cleaner main body 11 and an air cleaner upper cover 12 configured to be vertically divided into two parts, and the both are integrally coupled to exhibit a roughly deformed box shape. Openings 11a, 11b, and 11c are provided on a front surface, an upper surface, and a bottom surface, respectively, of the air cleaner main body 11. A seal member 13 (FIG. 5) is attached to and the air cleaner upper cover 12 is mounted on the opening 11b of the upper surface of the air cleaner main body 11 out of the above openings, and by coupling the air cleaner main body 11 and the air cleaner upper cover 12 through bolt fastening, the opening 11b is closed. In this case, as illustrated in FIG. 6 and FIG. 7, there are provided a plurality of (four, in this case) fastening parts 14, in which the air cleaner main body 11 has fastening bosses 14A formed thereon and has screw portions into which holts 15 are screwed. Further, on the air cleaner upper cover 12, fastening flange parts 14B are provided in a projecting manner, and openings through which the bolts 15 are inserted are provided to the fastening flange parts 14B. By fastening the four fastening parts 14, the air cleaner main body 11 and the air cleaner upper cover 12 are firmly coupled.

The opening 11a of the front surface of the air cleaner main body 11 is formed to be long in right and left directions as illustrated in FIG. 4A, and air is introduced into the opening 11a from intake ducts 124 illustrated in FIG. 4A, FIG. 5 and the like. Specifically, the opening 11a of the front surface is configured as an air introduction port. As illustrated in FIG. 5, an intake port 125 which communicates with the intake ducts 124 is opened on a front part of the steering head pipe 102. The intake ducts 124 communicated with the intake port 125 are routed around from both right and left sides of the steering head pipe 102 and joined together at the rear part thereof, and connected to the opening 11a of the air cleaner main body 11. The opening 11a of the air cleaner main body 11 is inserted into the intake ducts 124 via rubber seals 16 being seal members as illustrated in FIG. 5, and fixed in a floating manner.

Figure 4B:
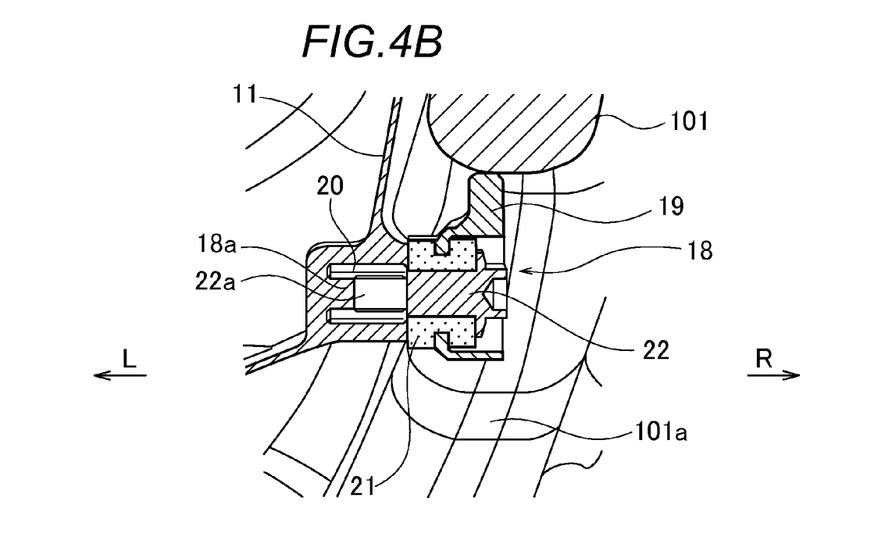
FIG. 4B is an enlarged sectional view of X part in FIG. 4A.

Further, as illustrated in FIG. 6 and the like, at corner portions in a downward direction in the vicinity of rear end of an outside surface of the air cleaner main body 11, a pair of right and left fastening parts 18 with respect to the vehicle body frames 101 are provided, and the air cleaner main body 11 is supported in a floating manner by fastening brackets 19 (refer to FIG. 2) provided to the vehicle body frames 101 in a projecting manner, at the respective fastening parts 18. More concretely, the fastening bracket 19 extends in a window part 101a formed on the vehicle body frame 101, and projects from the window part 101a in a side view, as illustrated in FIG. 2. FIG. 4B illustrates a detailed structure of the fastening part 18, in which an insert nut 20 is embedded in the fastening part 18. A cushion 21 is attached to the fastening bracket 19, and a fastening bolt 22 inserted into the cushion 21 is designed to be screwed into the insert nut 20. In this case, a screw portion 22a of the bolt 22 abuts on a seat 18a provided to the fastening part 18, and accordingly, it is designed such that the cushion 21 is fastened by a moderate amount of force, and the fastening part 18 is supported with no looseness.

As illustrated in FIG. 6 and FIG. 7, in the openings 11c of the bottom surface of the air cleaner main body 11, air cleaner bottom plates 23 are fastened to the air cleaner main body 11 via seal members. In the parallel four-cylinder engine of the present embodiment, #1 to #4 cylinders (which will be simply described as "#1" and the like, in the following explanation) are arranged, from the left, in the right and left directions (width direction) (refer to FIG. 8). A throttle body 123 is connected to each cylinder, and in the present example, the throttle bodies 123 are coupled to be unitized, via a bracket, in a combination of mutually adjacent throttle bodies. Specifically, four throttle bodies 123 are divided into two sets, being a set of #1 and #2, and a set of #3 and #4. There are provided two right and left openings 11c with respect to an air cleaner bottom plate 23L corresponding to #1 and #2, and an air cleaner bottom plate 23R corresponding to #3 and #4. Each of the air cleaner bottom plates 23 is fastened to the air cleaner main body 11 by three fastening parts 24 in this example, using bolts as fastening units.

On each of the air cleaner bottom plates 23, passage holes 23a connecting the engine combustion chamber and the inside of the air cleaner main body 11 are formed, and the intake air is set to flow through the passage holes 23a. Each of the air cleaner bottom plates 23 is further fastened to the corresponding throttle body 123 by two fastening parts 25, in this example, provided in the vicinity of outer peripheral portion of the passage hole 23a for each throttle body 123. Also in the fastening part 25, a bolt is used as a fastening unit. As illustrated in FIG. 4A and FIG. 5, the air cleaner main body 11 is coupled to upper end portions of the throttle bodies 123, but, the air cleaner bottom plates 23 are directly coupled to the throttle bodies 123, and the passage holes 23a are disposed by being aligned with intake passages of the throttle bodies 123.

Further, when referring to FIG. 6 and FIG. 7, at a position between the opening 11a of the front surface and the openings 11c of the bottom surface of the air cleaner main body 11, an air filter 26 is diagonally attached approximately toward a direction of the opening 11b of the upper surface. As illustrated in FIG. 4A and the like, the air filter 26 is formed in a cone shape, namely, a shape in which an upper part side is formed to have a narrow width, and in this example, the air filter 26 is fastened to the air cleaner main body 11 by four fastening parts 27. Also at the fastening part 27, a bolt is used as a fastening unit.

In the above-described case, a not-illustrated fuel tank is mounted and supported on a rear side of the air cleaner 10 mounted on the vehicle body frames 101. The fuel tank and the air cleaner 10 are integrally covered as a whole, by the tank cover 118.

Further, a shape of a part overlapped with the vehicle body frames 101 in a side view of FIG. 2, namely, a shape of the air cleaner main body 11 disposed on the inside of the vehicle body frames 101 is a shape in which the upper surface portion is narrower than a bottom surface portion, as illustrated in FIG. 4A. In this case, approximately uniform gaps S are formed along and between an outside surface of the air cleaner main body 11 and inner surfaces of the vehicle body frames 101. Further, the air cleaner upper cover 12 coupled to the opening 11b of the upper surface of the air cleaner main body 11 has a planar shape equal to or less than that of the opening 11b, as can be understood from FIG. 4A, FIG. 6 or the like. Specifically, the entire air cleaner 10 has a form of being fitted within the inner width in the right and left directions of the vehicle body frames 101.

Figure 8:
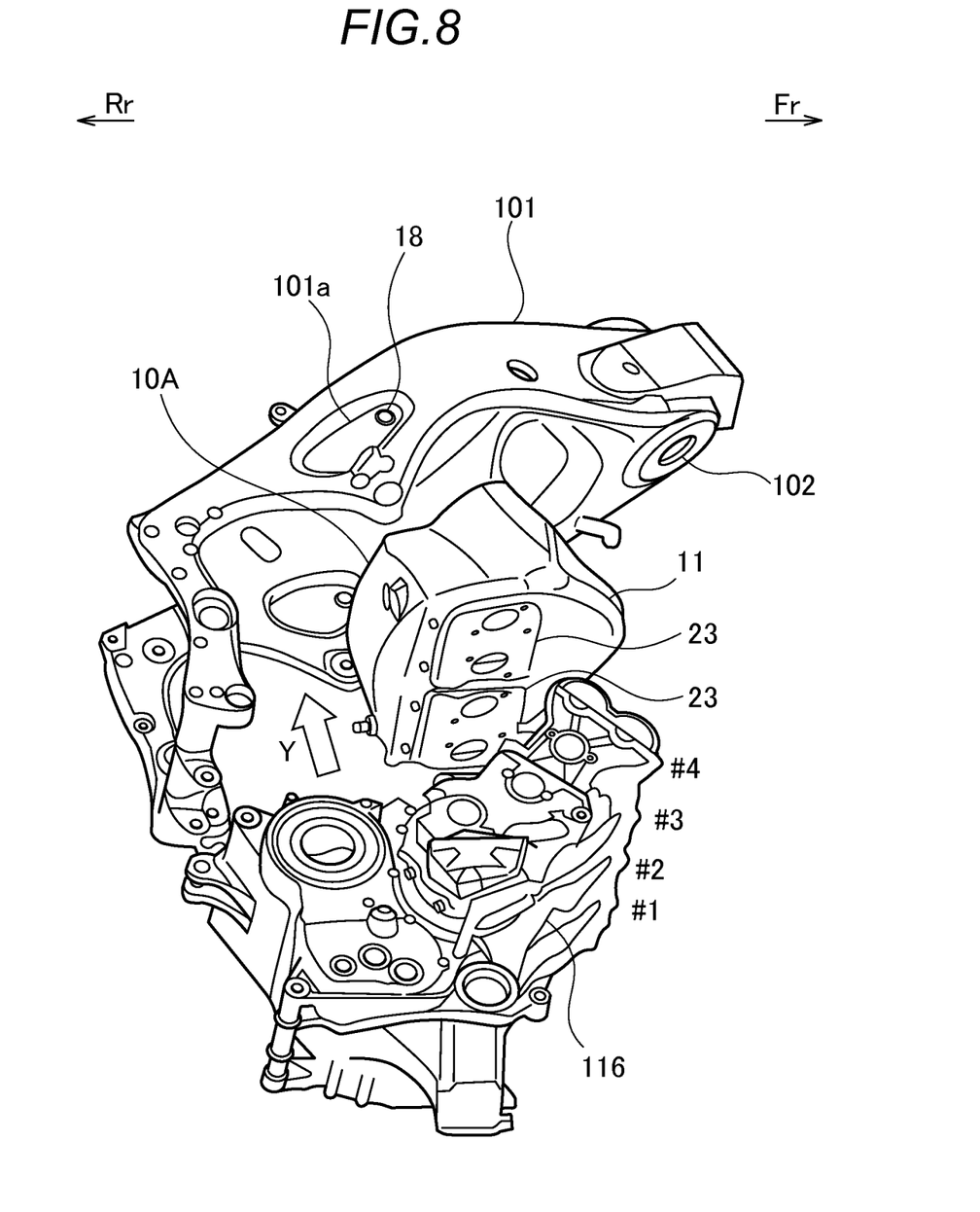
FIG. 8 is a perspective view illustrating an assembling step of the air cleaner and the like in the embodiment of the present invention.

Here, as illustrated in FIG. 8, when assembling the air cleaner 10 and the like, the air cleaner main body 11 is inserted from a position below (namely, from wide-width side of) the vehicle body frames 101 before mounting the engine unit 116 (arrow mark Y in FIG. 8), and is fixed to the vehicle body frames 101. Since it is set such that the air cleaner main body 11 has its upper surface side whose width is narrow, and the gaps S are secured between the air cleaner main body 11 and the inner surfaces of the vehicle body frames 101 as described above, the air cleaner main body 11 can be inserted and assembled, properly and with no difficulty, with respect to the vehicle body frames 101 being the twin spar frame.

By employing the twin spar frame, the frontal projected area of the vehicle becomes small, and the aerodynamic performance is improved. Further, by enlarging the degree of freedom when a rider rides the vehicle, riding characteristics are improved, and accordingly, it becomes possible to provide the motorcycle 100 having a parallel multicylinder engine with wide width mounted thereon while improving both of the aerodynamic performance and the riding characteristics.

Further, an adjustment of twisting of the vehicle body frames 101, and an adjustment of rigidity in a horizontal direction and a vertical direction, respectively, of the vehicle body frames 101 can be easily conducted based on characteristics (performance requirement) of the vehicle.

Figure 9:
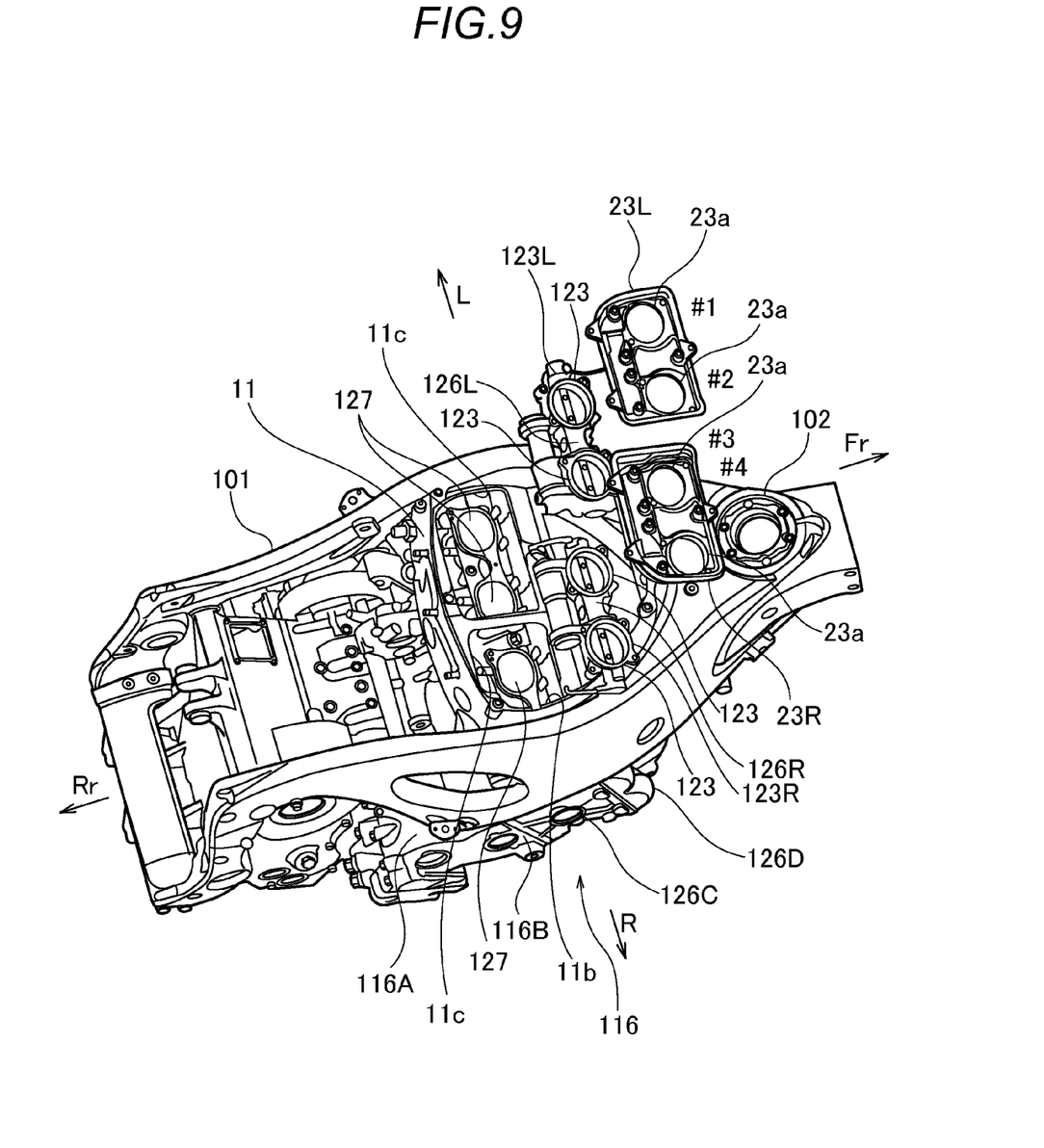
FIG. 9 is an exploded perspective view of the air cleaner mounted on the vehicle body frames in the embodiment of the present invention.

Further, in the present invention, when referring to FIG. 9, the throttle bodies 123 of #1 and #2 corresponding to the air cleaner bottom plate 23L are coupled to be unitized via a bracket 126L (referred to as throttle bodies 123L). A lower end side of the throttle bodies 123L is connected to intake ports 127 of #1 and #2 which are communicated with the engine combustion chamber in the cylinder head 116C. Further, the throttle bodies 123 and #3 and #4 corresponding to the air cleaner bottom plate 23R are coupled to be unitized via a bracket 126R (referred to as throttle bodies 123R). A lower end side of the throttle bodies 123R is connected to intake ports 127 of #3 and #4, in a similar manner.

The throttle bodies 123 can be attached/detached to/from the intake ports 127. The right and left openings 11c of the air cleaner main body 11 corresponding to the throttle bodies 123L and the throttle bodies 123R have shapes and sizes required to make the throttle bodies 123L and the throttle bodies 123R pass through the openings.

Incidentally, in the present invention, the openings 11a, 11b, and 11c are provided on the front surface, the upper surface, and the bottom surface, respectively, of the air cleaner main body 11, as described above. The seal member 13 (FIG. 5) is attached to and the air cleaner upper cover 12 is mounted on the opening 11b of the upper surface of the air cleaner main body 11 out of the above openings, and by coupling the air cleaner main body 11 and the air cleaner upper cover 12 through bolt fastening, the opening 11b is closed.

Figure 10:
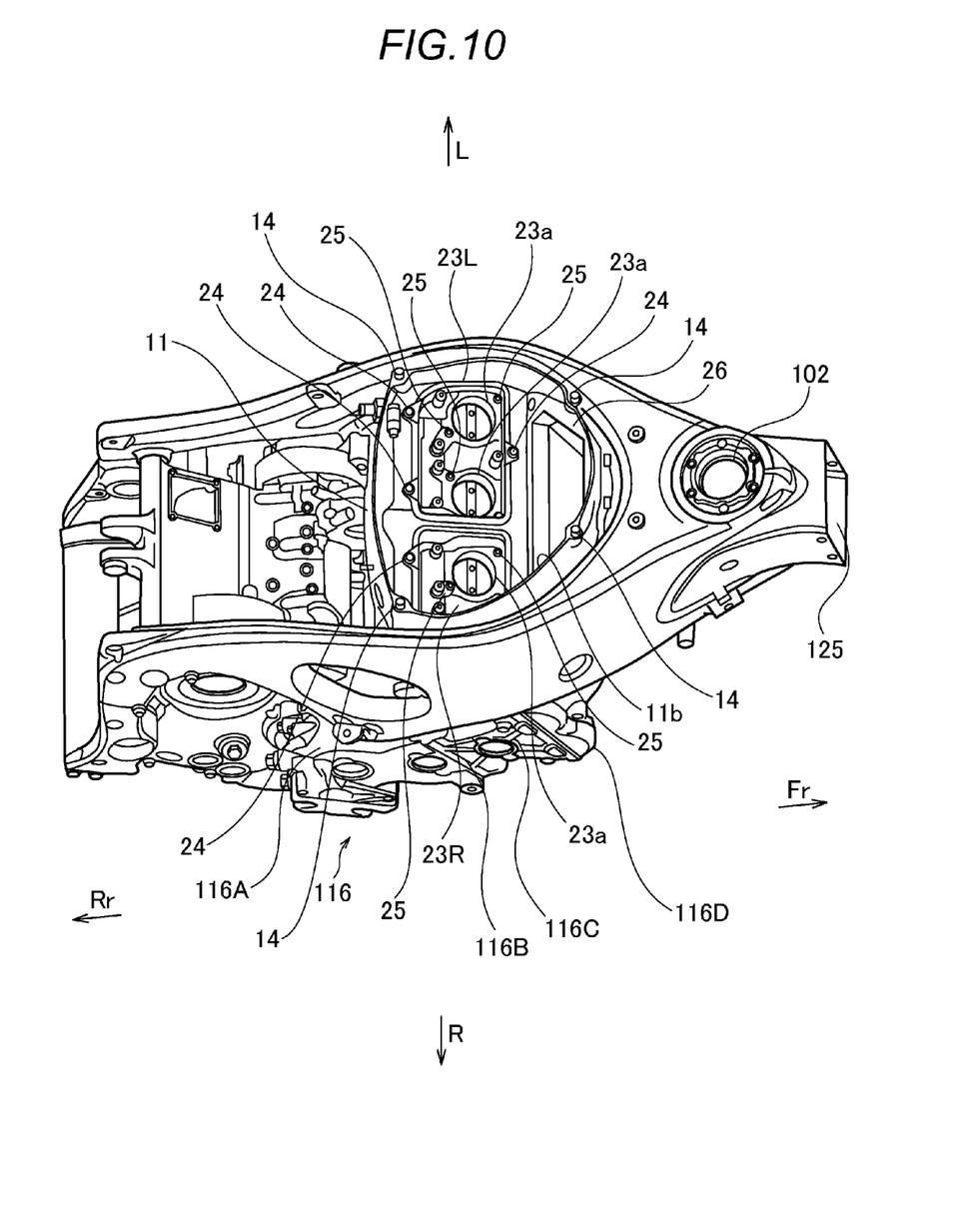
FIG. 10 is a perspective view when the bottom plates and the like of the air cleaner mounted on the vehicle body frames are attached, in the embodiment of the present invention.

When removing the air cleaner upper cover 12, the bolts 15 of the fastening parts 14 are loosened by being accessed from above, which enables to easily remove the air cleaner upper cover 12. Accordingly, the inside of the air cleaner main body 11 is opened as illustrated in FIG. 10, and under this state, it is possible to perform a maintenance work and the like easily and smoothly. Specifically, the air cleaner upper cover 12 functions as a so-called maintenance cap, and it is possible to greatly improve the maintainability.

Further, the air cleaner bottom plates 23 having the passage holes 23a are fastened to the openings 11c of the bottom surface of the air cleaner main body 11, and the opening 11a of the front surface is inserted into the intake ducts 124 of the vehicle body frames 101.

Figure 11:
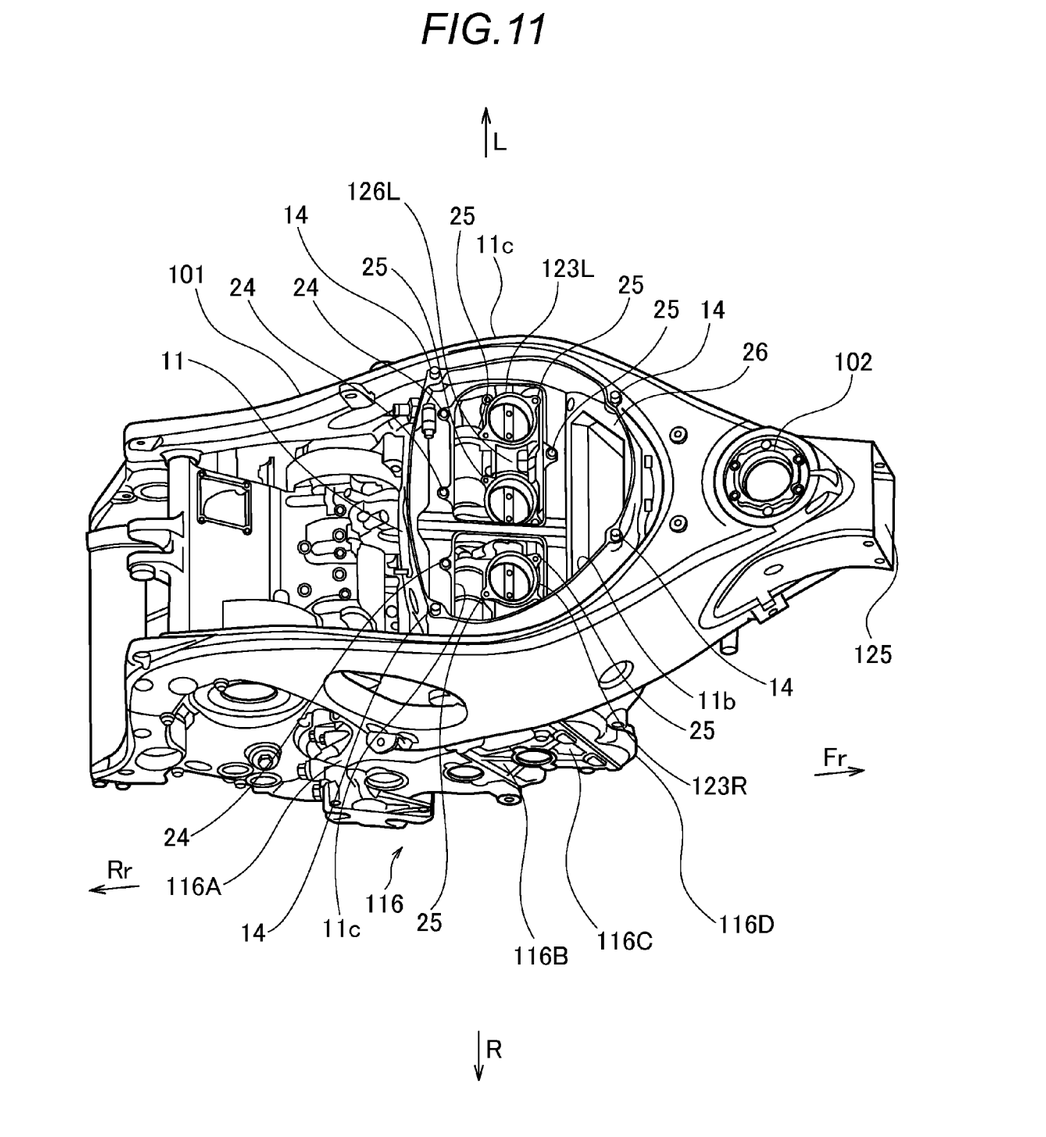
FIG. 11 is a perspective view when the bottom plates and the like of the air cleaner mounted on the vehicle body frames are detached, in the embodiment of the present invention.

By removing the air cleaner bottom plates 23, the openings 11c of the bottom surface are opened, and the throttle bodies 123L and the throttle bodies 123R are respectively exposed from the right and left openings 11c, as illustrated in FIG. 11. Further, the throttle bodies 123L and the throttle bodies 123R can be respectively taken out through the right and left openings 11c. As described above, there is no need to remove the air cleaner main body 11 and dismount the engine unit 116 from the vehicle body frames 101 for removing the throttle bodies 123 positioned between the engine side and the air cleaner main body 11.

Further, the throttle bodies 123 are divided based on the predetermined combination, and the air cleaner bottom plates 23 and the openings 11c corresponding thereto are also divided.

In the present example, by dividing the respective air cleaner bottom plates 23 and throttle bodies 123 into right and left two parts, even if the opening 11b of the upper surface of the air cleaner main body 11 is relatively small, it is possible to attach/detach the parts such as the throttle bodies 123L and the throttle bodies 123R. If the air cleaner main body 11 is formed to have a shape in which an upper part thereof is narrowed (inverted V-shape at cross section) in accordance with the vehicle body frames 101, good attachment/detachment performance of the parts is guaranteed, and the present invention exhibits a high effect by being applied to the twin spar frame.

Note that when the shape of the air cleaner main body 11 is not narrowed in the upward direction, there is substantially no problem even if the respective air cleaner bottom plates 23 and throttle bodies 123 are not divided into two parts.

Further, when the air cleaner bottom plates 23 are fastened to the throttle bodies 123 fixed to the engine side, the engine and the air cleaner main body 11 are integrally fixed. Accordingly, a positional accuracy and a dimensional accuracy of the passage holes 23a connecting the engine combustion chamber and the air cleaner main body 11 are secured, resulting in that a good intake performance is secured.

Further, the air cleaner main body 11 is inserted from a position below the vehicle body frames 101 before mounting the engine, the front part of the air cleaner main body 11 is inserted into the intake ducts 124 via the opening 11a of the front surface on the rubber seals 16, and the rear part of the air cleaner main body 11 is supported in a floating manner by the vehicle body frames 101 via the cushions 21.

Here, the air cleaner bottom plates 23 are fixed to the engine side via the throttle bodies 123, so that when fixing the air cleaner main body 11 and the air cleaner bottom plates 23, there is a need to absorb a dimensional error of parts and an error caused by mounting the engine. Since the attachment parts of the front and the rear of the air cleaner main body 11 are supported and fixed in a floating manner via the rubber members, it is possible to absorb such errors.

Further, at a position between the opening 11a of the front surface and the openings 11c of the bottom surface in the air cleaner main body 11, the air filter 26 diagonally disposed toward the direction of the opening 11b of the upper surface is attached.

By diagonally disposing the air filter 26 toward the opening 11b of the upper surface of the air cleaner main body 11, tine air filter 26 can be easily taken out or fastened from the opening 11b, resulting in that the maintainability is improved.

The present invention has been described above together with the various embodiments, but, the present invention is not limited only to these embodiments, and modifications and the like can be made within the scope of the present invention.

In the above-described embodiment, a multicylinder engine other than the four-cylinder engine, namely, a parallel six-cylinder engine, for example, can also be similarly applied to the engine unit 116. In that case, it is possible to divide six throttle bodies 123 and the like into three sets being a set of #1 and #2, a set of #3 and #4, and a set of #5 and #6.

According to the present invention, an air cleaner upper cover functions as a maintenance cap, and it is possible to greatly improve a maintainability. Further, by removing air cleaner bottom plates, throttle bodies can be taken out through openings of a bottom surface. As described above, it becomes possible to perform even a maintenance of the throttle bodies positioned between an engine and an air cleaner without removing the air cleaner from vehicle body frames or dismounting the engine from the vehicle body frames.

It should be noted that the above embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An air cleaner structure of a motorcycle comprising, in the motorcycle in which an engine is mounted on a plurality of vehicle body frames extended diagonally rear downward from a steering head pipe, a plurality of throttle bodies are disposed in a vertical posture in a passage connecting an air cleaner disposed above the engine and an engine combustion chamber, and a part of the air cleaner is disposed by being overlapped with the plurality of vehicle body frames in a shape in which upper surfaces thereof are narrowed inwardly, in a side view,     an air cleaner main body having openings formed on a front surface, an upper surface and a bottom surface thereof, respectively, wherein:

the opening of the upper surface has an air cleaner upper cover mounted thereon, and is closed by the air cleaner upper cover fastened by bolts via a first seal member;

air cleaner bottom plates are fastened to the air cleaner main body via second seal members in the openings of the bottom surface, and passage holes connecting the engine combustion chamber and the air cleaner main body are provided on the air cleaner bottom plates; and     the opening of the front surface is inserted into intake ducts of the plurality of vehicle body frames via third seal members, and configured as an air introduction port,     wherein the air cleaner upper cover is removable by being accessed from above the air cleaner, the inside of the air cleaner main body is opened under this state, and the openings of the bottom surface are opened and the throttle bodies are exposed by removing the air cleaner bottom plates from the inside of the air cleaner main body.

2. The air cleaner structure of the motorcycle according to claim 1, wherein the air cleaner main body is inserted from a position below the plurality of vehicle body frames before mounting the engine, a front part of the air cleaner main body is inserted into the intake ducts of the plurality of vehicle body frames via the opening of the front surface on the seal members, and a rear part of the air cleaner main body is supported in a floating manner by the plurality of vehicle body frames via cushion members.

3. The air cleaner structure of the motorcycle according to claim 1, wherein an air filter diagonally disposed toward a direction of the opening of the upper surface is attached between the opening of the front surface and the openings of the bottom surface in the air cleaner main body.

4. The air cleaner structure of the motorcycle according to claim 1, wherein:

the openings of the bottom surface are set to have a size capable of making the plurality of throttle bodies pass through the opening, and the plurality of throttle bodies are removable through the openings of the bottom surface by being accessed from above the air cleaner and removing the air cleaner upper cover and the air cleaner bottom plates.

5. The air cleaner structure of the motorcycle according to claim 1, wherein:

an inner width $w_1$ on the upper surface side of the plurality of vehicle body frames is set to be smaller than an inner width $w_2$ on the lower surface side, a shape of the air cleaner main body disposed on the inside of the plurality of vehicle body frames is a shape in which the upper surface portion is narrower than a bottom surface portion, and the entire air cleaner is fitted within the inner width in the right and left directions of the plurality of vehicle body frames.

6. The air cleaner structure of the motorcycle according to claim 5, wherein:

the motorcycle has a parallel multicylinder engine, and the plurality throttle bodies are divided in right and left directions corresponding to a predetermined combination of cylinders; and     at least two of the openings of the bottom surface are provided in the right and left directions by corresponding to the plurality of throttle bodies, and each of the openings is set to have a size capable of making the right and left throttle bodies pass through the opening.

7. The air cleaner structure of the motorcycle according to claim 6, wherein at least two of the air cleaner bottom plates are provided in right and left directions by corresponding to the openings of the bottom surface, and the respective air cleaner bottom plates are fastened to the corresponding throttle bodies.

8. An air cleaner structure of a motorcycle wherein the motorcycle includes an engine mounted on a plurality of vehicle body frames extending diagonally rearward and downward from a steering head pipe, wherein an air cleaner is disposed above the engine, a passage connects the air cleaner and an engine combustion chamber, a plurality of throttle bodies are disposed in a vertical posture in the passage, and a part of the air cleaner is overlapping disposed with the plurality of vehicle body frames in a shape in which upper surfaces of the plurality of vehicle body frames are narrowed inwardly, in a side view, wherein the air cleaner comprises:

an air cleaner main body comprising openings formed on a front surface, an upper surface and a bottom surface thereof, respectively;

an air cleaner upper cover mounted on the opening of the upper surface, wherein the opening of the upper surface is closed by the air cleaner upper cover fastened by bolts via a first seal member;

air cleaner bottom plates are fastened to the air cleaner main body via second seal members in the openings of the bottom surface, and passage holes connecting the engine combustion chamber and the air cleaner main body are provided on the air cleaner bottom plates; and     an air introduction port comprising intake ducts disposed in the plurality of vehicle body frames and inserted into the opening of the front surface and closed by via third seal members,     wherein the air cleaner upper cover is removable by being accessed from above the air cleaner,     wherein the air cleaner bottom plates are removable by being accessed from above the air cleaner and through the air cleaner main body, and     wherein when both the air cleaner upper cover and the air cleaner bottom plates are removed, the inside of the air cleaner main body is opened and the throttle bodies are exposed.

\* \* \* \* \*